Dec. 8, 1953  A. R. MOFFETT  2,661,626
FLUID PRESSURE GAUGE
Filed April 20, 1951
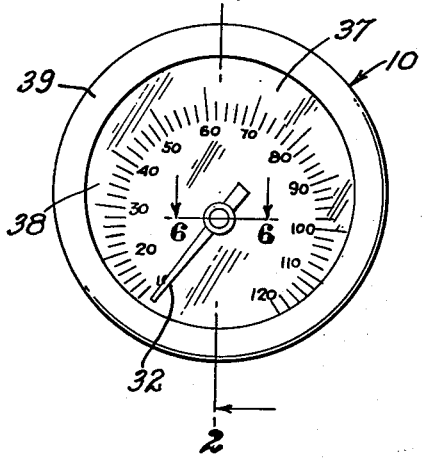
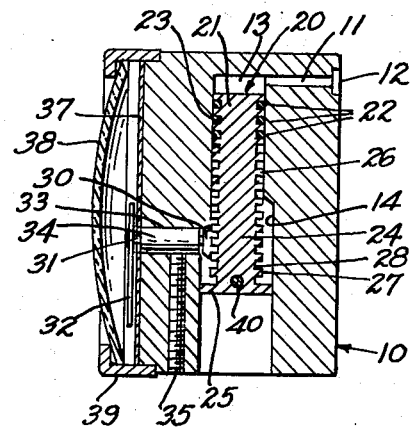
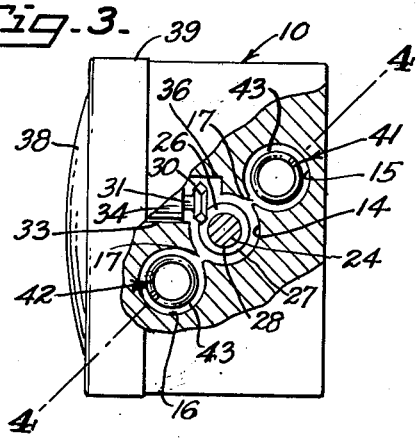
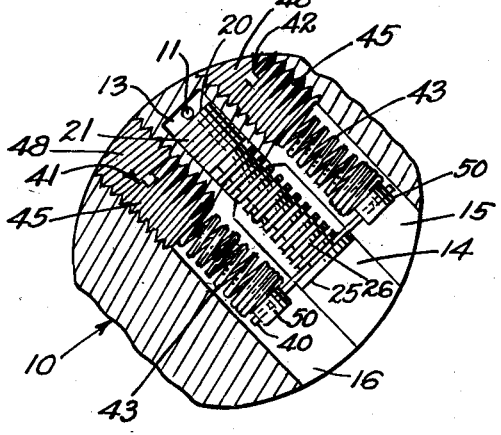
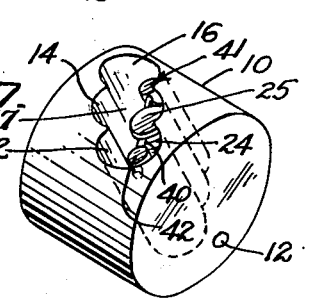
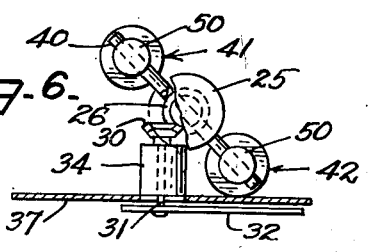
INVENTOR.
ARCHIBALD R. MOFFETT
BY
ATTORNEY Patented Dec. 8, 1953

2,661,626

UNITED STATES PATENT OFFICE 2,661,626

FLUID PRESSURE GAUGE

Archibald R. Moffett, Orinda, Calif.

Application April 20, 1951, Serial No. 222,010

5 Claims. (Cl. 73—419)

This invention relates to an improved fluid pressure gauge, and particularly to an improved air-pressure gauge.

One important use of the invention is to measure tire pressures. Tire gauges are subjected to hard and rough use around filling stations and garages, and it has been a problem to devise a gauge that will remain accurate under such hard use. Previous gauges have been easily broken and have gotten out of repair easily. Other failings of previous gauges are that they have been relatively complicated, have been expensive to manufacture, and have been composed of parts that too easily got out of working order. All these problems have been solved by the present invention.

Another problem solved by the invention is the provision of a dial-type gauge that is easy to read, in place of the sliding cylinder gauges that are more difficult to read. The instant invention provides a rugged gauge of relatively simple construction. It is easily assembled, eaasily serviced, and easily adjusted, and it will remain accurate during hard use.

My new gauge includes a housing having a cylindrical air pressure chamber and a piston that is moved by the air in the chamber against the counterpressure of a pair of springs. The piston has an extended cylindrical stem that is serrated to act as a rack with a rotatable pinion. The pinion is secured to a shaft to which the indicator needle is secured. The needle moves around a calibrated dial face so as to indicate the pressure of the fluid in the air-pressure chamber. The spring-pressure which counters the air pressure comprises a pair of springs, one on each side of the piston and linked to the piston by a yoke, two springs being used so that they can balance each other and in that way minimize any binding effect of the piston in its bore. The springs oppose the tendency of the piston to move under the influence of the air pressure, and stop the motion of the piston when the air pressure has moved it to a point where the spring tension equals the air pressure. The needle then indicates the pressure of the air in the chamber. When the air pressure is turned off, the springs restore the piston to its zero-position.

The invention, together with other objects and advantages, will be better understood from a description of a particular embodiment, which is given in accordance with United States Revised Statutes, Section 4888. The description is illustrative of the principles but not restrictive of them, the scope of the invention being defined in the appended claims.

In the drawings:

Fig. 1 is a view in front elevation of the gauge, showing the calibrated dial.

Fig. 2 is a view in section taken along the line 2—2 of Fig. 1.

Fig. 3 is a view in plan and partly in section looking at Figs. 1 and 2 from the top.

Fig. 4 is a view in section taken on the diagonal line 4—4 of Fig. 3.

Fig. 5 is a view in elevation and partly in section of one of the spring balancing units.

Fig. 6 is a diagrammatic view partly in cross-section taken about on the line 6—6 of Fig. 1.

Fig. 7 is a view in perspective of the housing looking at the back side.

The gauge includes a housing 10, preferably of some solid material such as brass or aluminum, which is bored or cored to provide the necessary passages and chambers. One bore provides a fluid inlet passage 11 (see Fig. 2) that is generally parallel to the axis of the housing 10. The passage 11 joins an inlet fitting 12 to a cylindrical chamber 13, which is preferably bored diametrically across the housing 10. Continuous with the chamber 13 and coaxial with it is a larger diametric bore 14. On each side of the bore 14, parallel to it, and at an equal distance from it are two other bores 15 and 16 (see Figs. 3, 4, and 7). In order to conserve space, the three bores may be disposed diagonally with respect to the axis of the cylindrical housing 10 (see Figs. 3 and 7). The three parallel bores 14, 15, and 16 connect at or near their outer ends to form a slit 17.

Air that enters the chamber 12 exerts its pressure on a piston 20 which fits closely in the chamber walls, the contact of the piston head 21 being assured by a plurality of piston rings 22 that fit in annular recesses 23. (See Figs. 2 and 4.) Preferably the rings 22 are made from neoprene or some similar synthetic rubber.

A stem 24 extends out behind the piston head 21 into the bore 14 and terminates in a round head 25 that fits closely enough in the bore 14 to keep the stem 24 and piston 20 aligned. Preferably the stem 24 is cylindrical and is machined so as to form a rack 26 made up of a number of projecting circular flanges 27 with recesses 28 between successive flanges 27. In this way the rack will engage the pinion regardless of whether the stem 24 is rotated.

The rack 26 engages the indicating mechanism through a pinion 30 and rotates it as the piston 20 is moved back and forth in its cylinder 13.

The pinion 30 is secured on one end of a shaft 31, and on the other end of the shaft is secured an indicator needle or pointer 32. The housing 10 is bored at 33 to receive a tubular bearing sleeve 34, inside which the shaft 31 turns, the sleeve 34 being held in place by a set screw 35. Preferably the bore 33 is widened and flared at 36, where it intersects the bore 14 and where the pinion 30 is positioned.

The relationship between the rack 26 and the pinion 30 is important. Preferably the radius of the pinion 30 is larger than the distance from the center line of the shaft 31 to the bottom of the rack teeth (see Fig. 6), so that by moving the bearing sleeve 34 axially the desired depth of engagement of the pinion teeth in the rack can be obtained.

The needle 32 moves in front of a dial face 37, which is calibrated so that the needle 32 may read directly in pressure units. The indicating mechanism and the dial face 37 are protected and kept clean by a clear plastic cover 38, that is held on by a bezel 39.

The counter-pressure assembly which limits the movement of the piston and enables accurate indication of the air pressure will now be described. The rack stem 24 is perforated adjacent its head 25 to receive a yoke or yoke pin 40 that extends out on either side of the stem 24 through the slit 17 into the bores 15 and 16. It serves to join the stem 24 to two spring assemblies 41 and 42. (See Figs. 3, 4, and 6.)

Each spring assembly 41 and 42 (see Fig. 5) includes a coil spring 43 that is normally under compression and opposes the tension-producing force of the air against the piston 20. At its inner end each spring 43 is reduced in diameter at 44, so that it may be threaded into the interior threads of a sleeve 45. A plug 46 of aluminum or other soft metal is then driven in inside the spring portion 44 to make the connection permanent and secure. The sleeve 45 also has exterior threads 47 that screw into a threaded opening 48 at one end of the bore 15 and 16. (See Fig. 4.) The outer end of the sleeve 45 is slotted at 49 so that the tension of the spring 43 may be adjusted by screwing the sleeve 45 in and out in the threads 48.

At the other end of the spring 43 is a spring swivel unit. This includes an anchor member 50 perforated at 51 to receive the yoke pin 40. The anchor member 50 has a flange 52 at its inner end, and an exteriorly threaded collar 53 fits around the member 50 above the flange 52. The spring 43 is threaded around the collar 53. The flange secures the pin 50 to the spring assembly 41 or 42 so that the assembly is free to rotate while the anchor member remains stationary. When the sleeve 45 is turned, the pin 50 remains stationary, but the spring 43 is stretched or compressed. In this manner, the tension of the spring 43 can be adjusted without affecting the yoke arrangement.

Since the yoke 40 links the piston 20 to the spring assemblies 41 and 42, the compression forces of the spring oppose the air pressure in the chamber 13. They thereby stabilize and determine the position of the racked stem 24 for each pound of pressure, and thereby also determine the position of the pointer 32.

In operation, the air passes from the passageway 11 into the chamber 13 and forces the piston 20 out against the pressure of the yoked and balanced springs 41 and 42. When piston 20 moves, the rack 26 rotates the pinion 30 and therefore the needle 32, which then registers the pressure on the dial 37. The movement of the pointer 32 may be calibrated by turning the sleeves 45 so as to stretch or compress the springs 43.

I claim:

1. A gauge for measuring fluid pressure, including in combination a housing having a chamber for the fluid under pressure; a piston movable in said chamber by said fluid, said piston having a racked stem; a pair of spring means joined by a single yoke to said piston, one on each side thereof and adapted to oppose movement of the piston caused by increases in fluid pressure in said chamber, each said spring means including a spring anchored at one end to a swivel member to which the yoke is secured, and anchored at its other end to a member threaded into said housing, whereby the tension on the spring can be adjusted by varying the position of said threaded member in said housing; and an indicator including a rotatable shaft journaled in said housing with a pointer at one end thereof and a pinion at the other end in engagement with said racked stem.

2. A gauge for fluid pressure, including in combination a housing bored to provide a chamber for the fluid under pressure; a piston movable in said chamber by the pressure of said fluid, said piston having a racked stem; a yoke extending out on each side of said stem; a pair of spring means, one connected to said yoke at each end thereof, each said spring means including a spring under tension anchored at its opposite end to a threaded member that fits in a recess in said housing and at its other end secured to a collar that is free to swivel about a member to which said yoke is secured, whereby the tension on the spring can be adjusted by varying the position of said threaded member in the housing, the anchoring of the springs being such that the springs oppose movement of the piston brought about by increases in fluid pressure; and an indicator including a rotatable shaft extending through and journaled in said housing and having a pointer at one end and a pinion at its other end that engages said racked stem for rotational movement of said pointer when said piston is moved.

3. A gauge for measuring fluid pressure, including in combination a housing having a chamber for the fluid under pressure; a piston movable in said chamber by said fluid, said piston having a racked stem; a pair of spring means yoked to said piston on either side thereof and adapted to oppose movement of the piston caused by increases in fluid pressure in said chamber, each said spring means having a swivel member secured to said yoke with a spring anchored at one end to said swivel member; and an indicator including a rotatable shaft journaled in said housing with a pointer at one end thereof and a pinion at the other end in engagement with said racked stem.

4. A gauge for fluid pressure, including in combination a housing bored to provide a chamber for the fluid under pressure; a piston movable in said chamber by the pressure of said fluid, said piston having a racked stem; a yoke extending out on each side of said stem; a pair of end members, one secured at the opposite extremities of said yoke; a swivel collar rotatably connected to each said end members, each collar having a spring under tension anchored at one end to said housing and at its other end to said collar, the anchoring of the springs being such that they oppose movement of the piston brought about by increases in fluid pressure; and an indicator including a rotatable shaft extending through and journaled in said housing and having a pointer at one end and a pinion at its other end that engages said racked stem for rotational movement of said pointer when said piston is moved.

5. In a pressure gauge the combination of a housing, a bore in said housing, a piston movable in said bore, a conduit adapted for connecting one end of said bore to a container in which there is a fluid under pressure; means for yieldably resisting the movement of said piston under the influence of said fluid pressure; a circular extension on said piston, said extension having teeth on its surface; a second bore in said housing, at right angles to said first mentioned bore and with the axis of said second bore extending to one side of the axis of said first bore; a bearing sleeve inserted in said second bore; a shaft mounted therein with an indicating means on one end and a pinion on its other end, said pinion having a radius which is greater than the distance between the center of its shaft and the bottom of the rack teeth, the radial plane of said pinion lying at an angle to the radial line of said circular extension which meets the pinion at the point of engagement thereof, rather than lying in the same plane therewith, whereby the depth of mesh of the pinion and the rack may be varied by moving said bearing sleeve along its axis.

ARCHIBALD R. MOFFETT.

References Cited in the file of this patent

UNITED STATES PATENTS

| Number | Name | Date |
|---|---|---|
| 185,687 | McIntosh | Dec. 26, 1876 |
| 1,234,774 | Kocourek | July 31, 1917 |
| 1,411,917 | Harris | Apr. 4, 1922 |
| 2,168,145 | Willis | Aug. 1, 1939 |

FOREIGN PATENTS

| Number | Country | Date |
|---|---|---|
| 543,936 | France | June 21, 1922 |